United States Patent [19]

Matsunawa et al.

[11] Patent Number: 4,774,591
[45] Date of Patent: Sep. 27, 1988

[54] IMAGE READER

[75] Inventors: Masahiko Matsunawa, Hino; Yoshinori Abe, Hachioji, both of Japan

[73] Assignee: Konishiroku Photo Industry Co., Ltd., Tokyo, Japan

[21] Appl. No.: 638,565

[22] Filed: Aug. 7, 1984

[30] Foreign Application Priority Data

Aug. 12, 1983 [JP] Japan .................. 58-148645
Aug. 12, 1983 [JP] Japan .................. 58-148646
Aug. 12, 1983 [JP] Japan .................. 58-148647

[51] Int. Cl.⁴ ............................................. H04N 1/04
[52] U.S. Cl. ..................... 358/285; 358/257; 358/293; 358/280
[58] Field of Search ............... 358/280, 286, 287, 293, 358/257, 285

[56] References Cited

U.S. PATENT DOCUMENTS

| | | | |
|---|---|---|---|
| 4,112,467 | 9/1978 | Ogawa | 358/257 |
| 4,383,275 | 5/1983 | Sasaki et al. | 358/280 |
| 4,424,535 | 1/1984 | Rothbart et al. | 358/293 |
| 4,549,220 | 10/1984 | Suzuki | 358/283 |
| 4,573,083 | 2/1986 | Shimizu | 358/257 |

Primary Examiner—Edward L. Coles, Sr.
Attorney, Agent, or Firm—Jordan B. Bierman

[57] ABSTRACT

An image reader having an automatic original feeder for feeding originals successively onto an original-setting surface, wherein an optical system for reading the images of the originals on the original-setting surface is returned to its original position when an external machine goes out of order to become incapable of receiving the image information from a means for sending out the read image information. A memory for storing the read image information is provided, so that when the external machine goes out of order to become incapable of receiving the information, the stored image information can be sent out of the external machine after the machine has been put in order.

8 Claims, 4 Drawing Sheets

IMAGE READER

BACKGROUND OF THE INVENTION

1. Field of the Invention:

This invention relates to an image reader adapted to read an image and send out the image information to an external machine.

2. Description of the Prior Art:

In these days in which the improved image-processing and image-transmission techniques are available, it is demanded that an independently-usable image reader and an image reader combined with an original feeder to read a large quantity of originals come into existence. There are some problems which possibly arise while an apparatus of this kind is practically used. Namely, when a trouble occurs in an external machine (for example, a host computer, hard copy device or the like) to which the image information is fed, or when an external machine is busy the image information fed out to the external machine is ignored so that an apparent image reading error occurs. A prolonged interruption of an operation of the apparatus causes the alternation of the quantity of light from a lamp to cause an image signal, which is generated after the reading operation is resumed, to be deteriorated.

A problem occurring while such apparatuses are used practically is that the optimum processes (binarization methods or other modified methods) for line and letter originals (which will herein-after be called simply as "line originals") and gradient originals are different. For example, in order to binarize an image signal with respect to a line original it is necessary to use a fixed threshold value corresponding to the density of the ground. In order to binarize an image signal with respect to a pictorial image original (toned image original) it is necessary to use a dither process. If these binarization methods are used inversely, the letters in a line original are broken, so that the reproducibility of thin lines decreases greatly, and the portions of an intermediate tone of color of a pictorial image original are not reproduced properly, i.e. a pictorial image original is reproduced darkly in its entirety. Therefore, the line originals and pictorial image originals must be collected separately in advance to be fed to an image reader. This makes it necessary to carry out troublesome operations for sorting the originals according to their types and arrange the originals in order of page after the reading thereof has been completed. It takes very much time to carry out these operations, and it becomes impossible to make the best use of the functions of an automatic document feeder.

SUMMARY OF THE INVENTION

The present invention has been developed in view of the above-mentioned demands for and problems involved in an apparatus of this kind. It is an object of the present invention to materialize an image reader which is capable of sending the read image information to an external machine reliably.

An image reader according to the present invention, which is capable of achieving the above object, consists of an automatic original feeder for feeding originals successively onto an original-setting surface, an optical system for reading the images on the originals, a means for sending out the read image information to an external machine, and a means for returning the optical system to its original position when the external machine goes out of order to become incapable of receiving the image information. Another embodiment of the present invention consists of an automatic document feeder for feeding originals successively onto an original-setting surface, an optical system for reading the images on the originals, a means for sending out the read image information to an external machine, a memory for storing the read image information wholly thereon even when the external machine goes out of order to become incapable of receiving the image information, to thereby enable the stored image information to be fed out to the external machine after the machine has been put in order, and a means for returning the optical system to its original position when the external machine goes out of order as mentioned above.

Another object of the present invention is to materialize an image reader which is capable of sending the read image information to an external machine reliably, and preventing the quality of an image signal, which is generated after an image-reading operation has been resumed, from deterioration.

An image reader according to the present invention, which is capable of achieving this object, consists of an automatic original feeder for feeding originals successively onto an original-setting surface an optical system for reading the images on the originals, a means for sending out the read image informat;on to an external machine, and a means for returning the optical system to its original position when the external machine goes out of order to become incapable of receiving the image information, and carrying out a shade-correction operation after the signal-receiving condition of the external machine has been put in order, to then resume an image-reading operation.

Still another object of the present invention is to materialize an image reader which is capable of reading a large quantity of originals at a high speed, and omitt;ng the operations for sorting the originals according to their types and arranging the originals in order of page after the reading thereof has been completed.

An image reader according to the present invention, which is capable of achieving this object, consists of an automatic document feeder for feeding originals successively onto an original-setting surface, a means for reading the image on the original fed onto the original setting surface, a means for binarizing the read image information to send the binarized information to an external machine, and an image discriminator for identifying the type of the image on an original being fed, to select a threshold value on the basis of the results of the discrimination operation, the threshold value being used for the binarization of the image signal.

The above and other objects as well as advantageous features of the invention will become apparent from the following description of the preferred embodiment taken in conjunction with the accompanying drawings.

DESCRIPTION OF THE PREFERRED EMBODIMENTS

Figure 1:
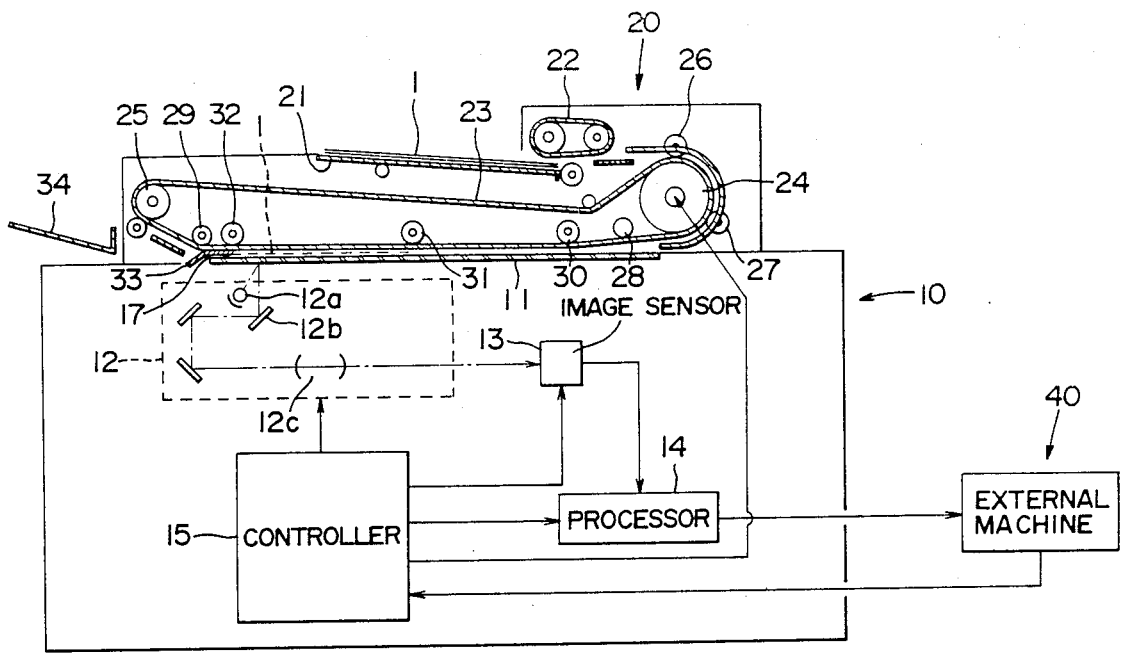
FIG. 1 is a construction diagram of an embodiment of the present invention.

FIG. 1 illustrates an embodiment of the invention referred to previously. Referring to the drawing, reference numeral 10 denotes an image reader 20 an automatic document feeder, and 40 an external machine. In the image reader, reference numeral 11 denotes an original-setting glass (original-placing table) on which an original 1 is set, and an optical scanning system member 12 adapted to emit the light from a light source 12a onto the original 1 set on the glass 11, and introduce the reflected light therefrom into an image sensor 13 via a mirror 12b and a lens 12c. The image sensor 13 consists essentially of a solid state image sensor as a CCD or a photodiode array. An optical reading member comprising said optical scanning system member 12 and said image sensor 13 is called as an optical system. Each of these image sensor may consist of a plurality of elements. The elements of the image sensor 13 in this embodiment are arranged in the perpendicular direction of the surface of FIG. 1, and the outputs from these elements are read successively to carry out a primary scanning operation. An auxiliary scanning operation is carried out as the optical scanning system 12 is moved in the lateral direction of FIG. 1. Reference numeral 14 denotes a processor adapted to suitably process (convert an output from the image sensor 13 into a binarized signal by using, for example, a dither process) an output from the image sensor 13 to send an image signal to the external machine 40, and 15 a controller adapted to control the operations and movements of various parts, such as a feeding operation of the automatic document feeder 20 and a movement of the optical scanning system 12. The controller 15 is so constructed that, when the external machine 40 is in an image-signal-non-receivable condition, a signal representative of the condition is applied thereinto. Reference numeral 17 denotes a shade correction reference plate of a uniform density, which is, in this embodiment, fixed to an upper surface of a left end portion in the drawing of the original glass 11 in such a manner that a surface of a reference density of the plate 17 contacts the mentioned surface of the glass 11, or that the plate 17 is mounted on the lower surface of the glass 11 so as to face the reference density of the plate 17 to the scanning system 12.

On the other hand, the automatic original feeder 20 consists of a paper feed unit 22 for feeding one by one the originals 1 placed on a paper feed tray 21, a conveyor belt 23 for feeding the original 1 to the left in the drawing while pressing at its outer surface the original 1 toward the original glass 11, a driving roller 24 and driven roller 25 for securing the above-mentioned movement of the conveyor belt 23, pressure rollers 26, 27 for pressing the original 1, which has been fed by the paper feed unit 22, against the conveyor belt 23 (the portion of the belt 23 which is wrapped around the driving roller 24) so as to send the original 1 to a position in which it starts to transfer by the belt 23, guide rollers 28, 29 for controlling the portion of the conveyor belt 23 which constitues a main transfer path, pressure rollers 30, 31 for pressing the conveyor belt 23 toward the original setting glass 11 between the guide rollers 28, 29 a stopper 33 cooperating with a stopper roller 32 to stop the original 1 on the original glass 11 at a suitable setting position, and a paper discharge tray 34 on which the originals 1 read and discharged are stacked.

The operation of the image reader of the above-mentioned construction will now be described.

First, the original 1 is set on the paper feed tray 21. When a reading starting button (not shown) is pressed, the optical scanning system 12 is returned to an initial position (the extreme left position in the drawing, i.e. a scanning starting position) by the controller 15, and the paper feed unit 22 and conveyor belt 23 are turned to transfer the original 1. The original 1 is stopped in a suitable position by an upper end portion which projects from the upper surface of the original glass 11, of the stopper 33 to then stop the movement of the conveyor belt 23 as well. The light is then applied from the light source 12a to the original 1 (the light source 12a may be constantly operated), and the reflected light from the original 1 is introduced into the image sensor 13 via the mirror 12b and lens 12c to form an image therein. The outputs (analog image signals) from the elements of the image sensor 13 are outputted in order, which are applied into the processor 14, the image signals processed suitably in the processor 14 being sent out to the external machine 40.

The primary scanning of the original is done as the signals are outputted in order from the elements of the image sensor 13, while the auxiliary scanning thereof is done as the optical scanning system 12 is moved to right in FIG. 1. When the reading of one original 1 has thus been completed, the upper end portion of the stopper 33 is moved downward from the upper surface of the original glass 11, and the conveyor belt 23 is turned again to send the read original 1 to the paper discharge tray 34. At the same time, the transfer of a subsequent original 1 is started to set the same at a suitable position on the original glass 11. Similar reading operations are carried out repeatedly, and, finally, all of the originals 1 placed on the paper feed tray 21 are read.

The above is a description of an operation of the embodiment, in which no troubles occur in the external machine 40 with no other processing work of a higher priority started therein. When the external machine 40 is put in an image-information-non-receivable condition, the embodiment is operated as follows. First when the external machine 40 is put in a signal-non-receivable condition, a signal representative of such condition is sent out therefrom to the controller 15. The controller 15 which has received such a signal returns the optical reading system 12 to the original position and interrupts the sending of image signals from the processor 14 to the external machine 40. During this time, the original 1 on the original glass 11 is left as it is.

When the external machine 40 has been restored to the normal signal-receiving condition, the controller 15 sends a signal, which is representative of the restarting of the sending of all image information on the same original, to the external machine 40 to then start again the reading of the same original by the optical scanning system 12, the signal representative of the read image being sent out from the processor 14 to the external machine. Accordingly, the omission of the sending of image information due to the interruption of the operation of the processor 14 does not occur.

Figure 2:
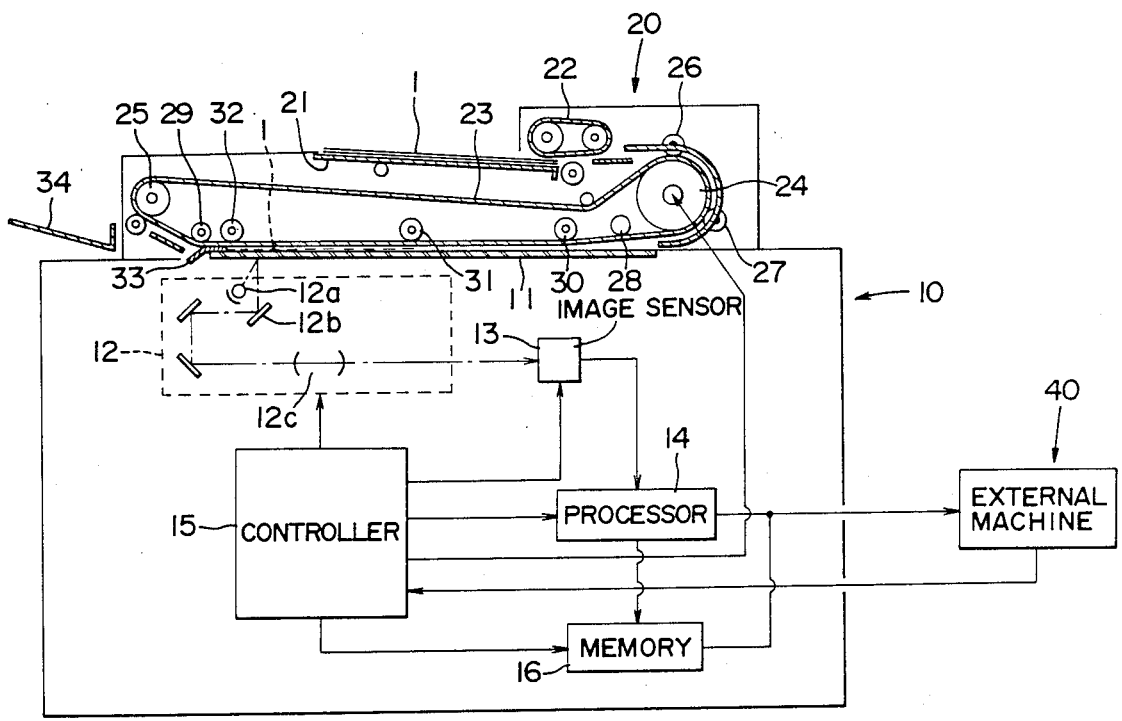
FIG. 2 is a construction diagram of another embodiment of the present invention.

FIG. 2 is a construction diagram of another embodiment of the present invention (the parts corresponding to those in FIG. 1 are designated by the same reference numerals). This embodiment is different from the embodiment of FIG. 1 in that the former is provided with a memory 16 for storing the read image information. Accordingly, when the external machine 40 is put in an image-information-non-receivable condition during a reading operation in this embodiment, the reading operation is not interrupted immediately; the image information being obtained is wholly read to be stored in the memory 16, and this image information is sent to the external machine 40 after the machine 40 has got out of the signal-non-receivable condition. However, the capacity of the memory 16 is limited. Therefore, when the external machine 40 is still in a signal-non-receivable condition at the instant at which the reading of the originals the quantity of which corresponds to the capacity of the memory 16 has been completed, the controller 15 is operated to return the optical scanning system 12 to the home position (initial position) in the same manner as in the embodiment of FIG. 1. For example, when the memory 16 has only such a capacity that corresponds to one page of image information, the reading of only the original 1 now being read is kept done. When this reading operation has been completed, the optical scanning system 12 is returned to the home position, and the read original 1 is discharged as a subsequent original 1 is set, to stand by until the external machine 40 has got out of the signal-non-receivable condition. When the external machine 40 has got out of the signal-non-receivable condition, the controller 15 operates the memory 16 so as to send the image information stored therein to the external machine 40. The reading of a subsequent original 1 is then started. Accordingly, this embodiment not only prevents the omission of the reading of image information even when the sending of image signals from the processor 14 is interrupted, but also enables the loss of time to be minimized.

When a trouble occurs in the automatic document feeder 20 in the above-described two embodiments, the optical scanning system 12 is returned to the original position so as to start a reading operation again as soon as the trouble has been eliminated. This enables the reading operation to be re-started speedily.

The above are the descriptions of image readers in which a primary scanning operation is carried out with the optical scanning system not moved and in which an image sensor having arrayed elements is used; the present invention is not limited to these image readers. For example, a primary scanning operation may be carried out by traversing the upper surface of the original 1 with a laser beam, and the reflected light from the original 1 may be introduced into an image sensor having a single light-receiving surface, via a light-introducing member, such as an optical fiber, or an optical condenser member.

As described above, the present invention can provide an image reader capable of sending the read image information to an external machine reliably.

The operation of still another embodiment of the present invention will now be described. In this embodiment, the outputs from the elements of the image sensor 13 are outputted in order and applied into the processor 14 to calculate a correction coefficient for use in a shade correction operation. The reading of the original 1 is then started, and the outputs (analog image signals) from the elements of the image sensor 13 are applied into the processor 14 in order. The image signals, which are then subjected to the shade correction and other suitable treatment, are sent to the external machine 40. The shade correction is done every time a predetermined number of originals have been read.

The above is a description of an operation of the embodiment, in which no troubles occur in the external machine 40 with no other processing work of a higher priority started therein. When the external machine 40 is put in an image-information-non-receivable condition, the embodiment is operated in the same manner as in the previously-described embodiments. When the external machine 40 has been got out of the signal-non-receivable condition, a signal, which is representative of the restarting of the sending (feeding) of all image information on the same original, is sent from the controller 15 to the external machine 40. A correction coefficient for use in a shade correction operation is then newly determined. The reading of the same original is restarted by the optical reading system 12. The read image signals are subjected to the shade correction and other necessary treatment in the processor 14 to be thereafter sent to the external machine 40. Accordingly, the omission of the reading of image information does not occur even when the sending of signals from the processor to the external machine is interrupted, nor does the deterioration of image signals generated after the reading operation has been resumed occur.

When a trouble occurs in the automatic original feeder 20 in the two embodiments described previously, the optical scanning system 12 is returned to the original position so as to start a reading operation again as soon as the trouble has been eliminated. In these cases, a shade correction coefficient is also newly determined. Therefore, the reading operation can be resumed speedily, and the deterioration of image signals does not occur.

As described above, the present invention can provide an image reader which is capable of sending the read image information to an external machine reliably and preventing the deterioration of image signals.

Figure 3:
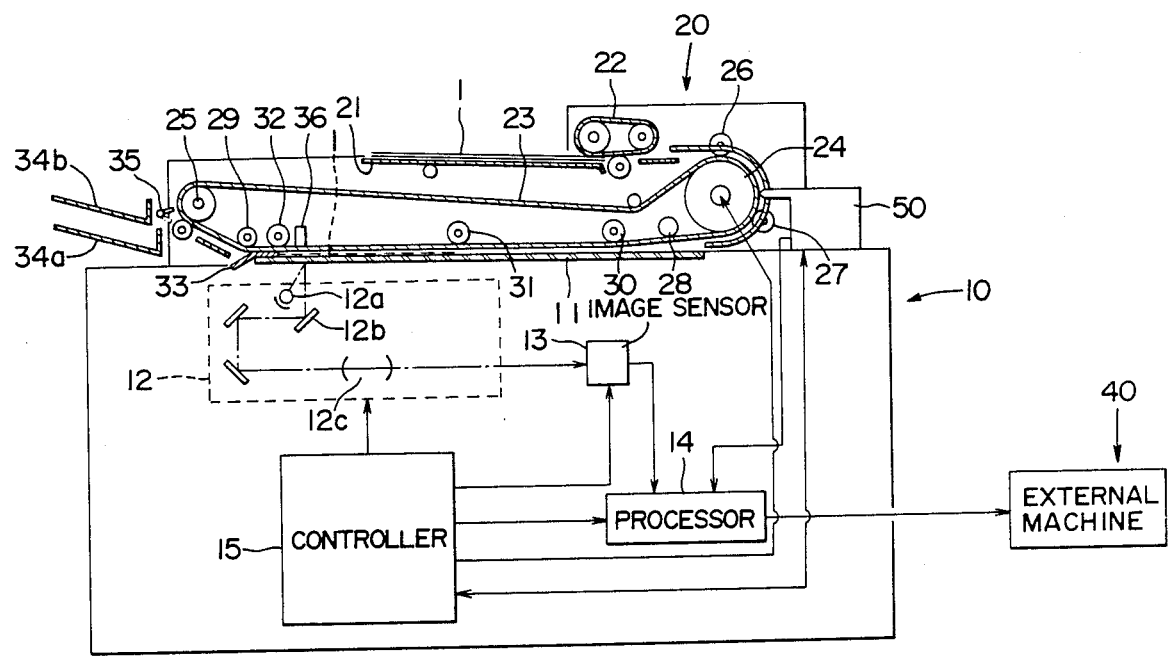
FIG. 3 is a construction diagram of still another embodiment of the present invention.

A further embodiment of the present invention is provided with paper discharge trays 34a, 34b on which the read and discharged originals 1 are stacked, a selector arm 35 capable of being turned at a selected angle to discharge the originals 1 into a desired paper discharge tray 34a or 34b, and a sensor 36 for detecting an original 1 set in a correct position on the original glass 11, as shown in FIG. 3.

Also, an image discriminator 50 is attached to the automatic document feeder 20 so that the type of the image on the original document being fed can be identified. This reading means consists of a lens and an image-taking device (similar to those mentioned previously). Various methods (principles) of discriminating a line original from a pictorial image original have been proposed by the inventors of this invention. These methods include, for example, a method having the steps of determining the density histogram from a density signal obtained by using a reading spot of a predetermined size, and identifying the type of the image on the basis of the pattern of the density histogram. This method will be taken as an example to describe the image-discriminating method.

The time series pattern of a light-quantity signal (effective density) corresponding to an image density of a line original which signal is obtained when the image on the original (region to be discriminated) is scanned by using a unit reading spot (which will hereinafter be called simply "spot") of a small area, is a pattern in which one or a small number of high-density signals scatter among a large number of low-density signals. In case of a pictorial image original, the time series pattern in which high-, intermediate- or low-density signals are distributed at a comparatively high percentage is obtained. On the other hand, the time series pattern of a light-quantity signal (effective density) corresponding to an image density of a line original, which signal is obtained when the image is scanned by using a spot of a comparatively large area, has a far smaller number of high-density signals as compared with the time series pattern of a similar signal obtained when a spot of a small area is used. However, in case of a pictorial image original, the distributions of high-density signals in such time series patterns do not differ greatly.

Figure 4:
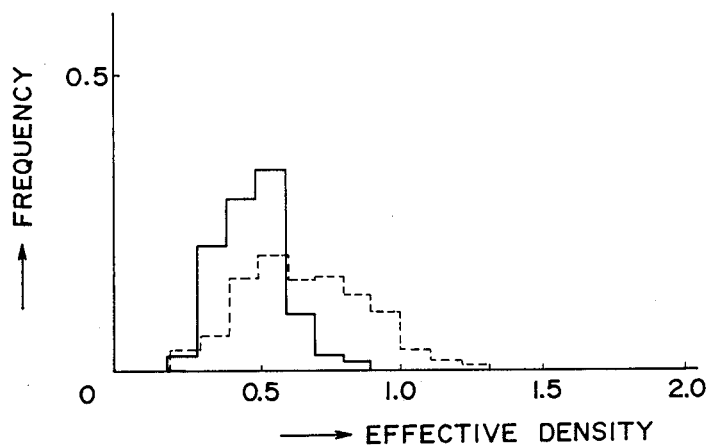
FIGS. 4 and 5 are histograms for use in explaining an example of an image-discriminating method.
Figure 5:
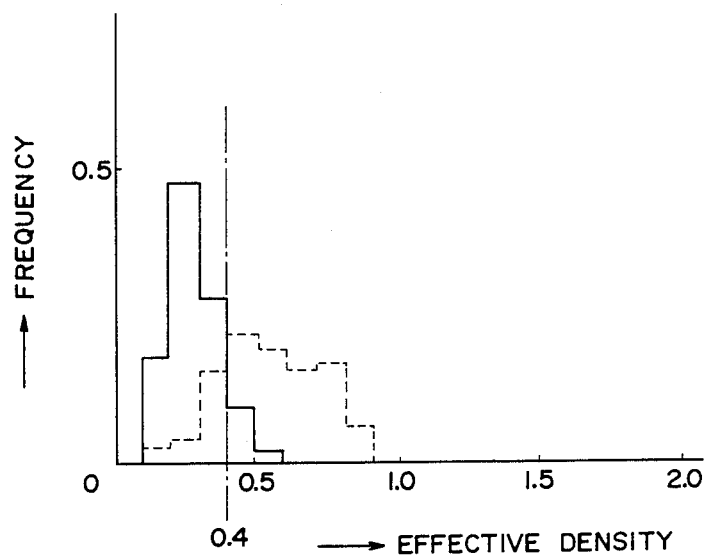

The differences between the histograms of effective densities, which are ascribed to the sizes of the spots used will now be described. FIGS. 4 and 5 are histograms (in which the density of 0.1 is used as a density section) obtained by scanning a letter image portion (line original) and a photographic image portion (pictorial image original) of a certain newspaper at regular intervals of 1 mm by using a square spot having the length of one side of 0.1 mm (0.01 mm$^2$) and a spot having a diameter of 2 mm (3.14 mm$^2$), respectively. The histograms shown by full lines are obtained from the letter image portion (line original), and the histograms shown by broken lines from the photographic image portion (pictorial image original). When these two graphs are compared with each other, it may be clearly understood that the peak of the histogram of the line original, which is obtained by using a spot of 2 mm in diameter, is on the low-density side much more than the peak of the histogram of the line original, which is obtained by using a square spot having the length of one side of 0.1 mm. On the other hand, the peaks of the pictorial image originals are not far away from each other. The above relation does not substantially vary even when the sampling intervals varied to 0.3 mm, 0.9 mm, 1.0 mm and 1.5 mm. This indicates that the above-mentioned relation between the peaks of the histograms is ascribable to the sizes of the spots. The density section of the histograms may be determined arbitrarily. The above-mentioned phenomenon of separation of the peaks of the histograms is also observed irrespective of the magnitude of the density section. The amount of movement of peaks of histograms of the line original to the low-density side depends upon the size of a spot with which the original is read. This amount of movement varies a little depending upon the nature of the image; statistics show that the amount of movement mentioned above is markedly large when the size of the spot in use is not less than 0.01 mm$^2$, especially not less than 1 mm$^2$.

Figure 6:
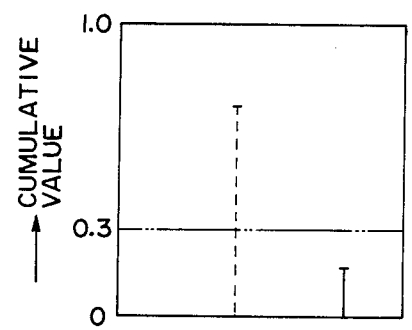
FIG. 6 is a bar graph showing the cumulative values of the density frequencies obtained from the histogram in FIG. 5.

Therefore in the image-discriminating method employed in this invention, the movement of the peak densities is specially studied. For example, the effective density 0.4 (shown by a one-dot chain line) is determined as shown in FIG. 5, as a reference value (called "a first threshold value") for discriminating line and gradient originals from each other, to determine the cumulative values of density frequencies of the line and pictorial image originals on the high or low density side of the density threshold value. FIG. 6 is a bar graph of such cumulative values on the high density side. The axis of ordinates of the graph represents the cumulative values (the full line shows the histogram of a line original, and the broken line the histogram of a pictorial image original) determined on the basis of a reference quantity of 1 which represents a total number (of scanning points) of operations for sampling the image density which were carried out to prepare each of the histograms. As is clear from this drawing, the peak of frequency in the histogram obtained from a line original is deep on the low density side, so that the cumulative value is extremely small. Conversely, the peak of frequency in the histogram obtained from a pictorial image original is not deep on the low density side, so that the cumulative value is large.

Accordingly, when a threshold value (called "a second threshold value") for use in discriminating the type of an image is set at an intermediate point between the two cumulative values in the graph, the line and gradient originals can be discriminated from each other by comparing a cumulative value obtained from an image with the second threshold value. In this method, 0.3 is set as a second threshold value as shown by a two-dot chain line in FIG. 6.

It is the matter of course that, even when a cumulative value on the low density side is determined, a second threshold value for discriminating images can be set in the same manner as mentioned above. Accordingly, the result of an image-discriminating operation can be obtained in the form of a binarized signal.

Figure 7:
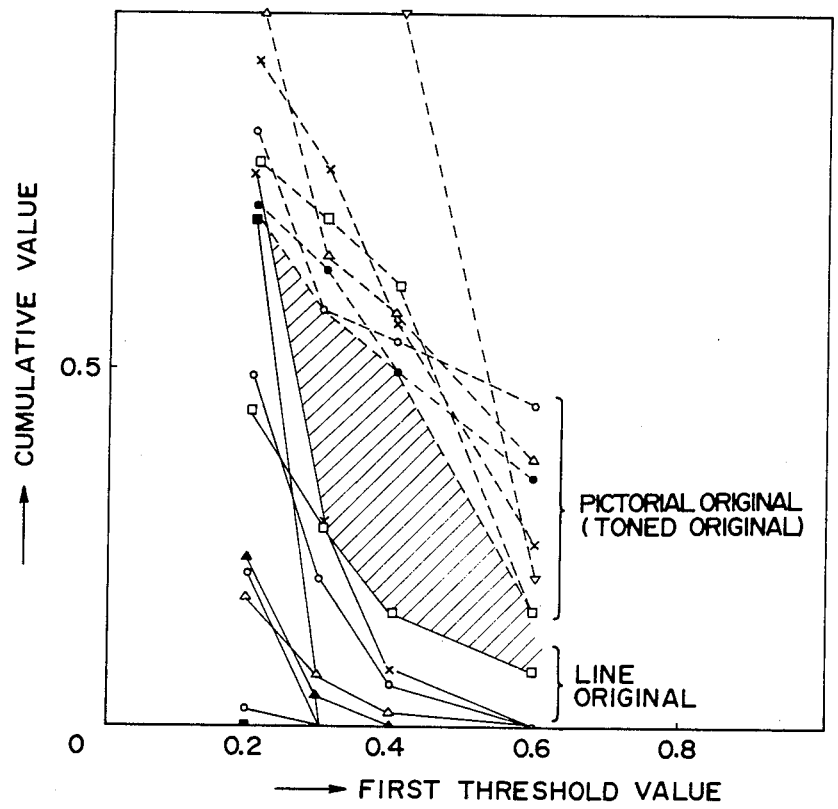
FIG. 7 is a graph showing the cumulative values in various types of images.

FIG. 7 is a graph showing the cumulative values determined when 0.2, 0.3 0.4 and 0.6 are used as first threshold values. The full lines and broken lines in the graph represent the cumulative values of a line original and a pictorial image original, respectively. It can be understood from the drawing that a first threshold value should be set to a level corresponding to an effective density of around 0.2–0.6, preferably in the vicinity of 0.4. It can also be understood that a second threshold value should be set in the hatched portion of the drawing.

The operation of the image reader of the above-mentioned construction will now be described.

First, the original 1 is set on the paper feed tray 21. When a reading starting button (not shown) is pressed, the optical reading system 12 is returned to an initial position (the extreme left position in the drawing, i.e. a scanning starting position) by the controller 15, and the paper feed unit 22 and conveyor belt 23 are turned to transfer the original 1. The original 1 is stopped in a suitable position by an upper end portion, which projects from the upper surface of the original glass 11, of the stopper 33 to then stop the movement of the conveyor belt 23 as well. While the original is thus transferred, the type of the image thereon is identified by the image discriminator 50, and a signal representative of the type of the image is applied into the processor 14 with a signal, which represents the obtainment of the discrimination result, applied into the controller 15. In the meantime, the original 1 is set in a proper position by the sensor 36, and a signal, which represents the completion of setting the original 1 properly, is applied into the controller 15. When these two signals are applied into the controller 15, it turns on the light source 12a to apply the light (which may be emitted therefrom before the controller 15 has received such signals) to the original 1, and the reflected light therefrom is introduced into the image sensor 13 via the mirror 12b and lens 12c to form an image thereon. The outputs (analog image signals) from the elements of the image sensor 13 are then outputted in order, to be applied into the processor 14, in which the signals are binarized by using a threshold value which corresponds to the discrimination result. The resultant image signals are sent to the external machine 40.

The primary scanning of the original is done as the signals are extracted in order from the elements of the image sensor 13, while the auxiliary scanning thereof is done as the optical scanning system 12 is moved to right in FIG. 3. When the reading of one original 1 has thus been completed, the upper end portion of the stopper 33 is moved downward from the upper surface of the original glass 11, and the conveyor belt 23 is turned again to send the read original 1 to the paper discharge tray 34a. At the same time, the transfer of a subsequent original 1 is started to set the same at a suitable position on the original glass 11. Similar reading operations are carried out repeatedly and finally all of the originals 1 placed on the paper feed tray 21 are read.

The above is a description of the case where the type of the original is identified clearly by the image discriminator 50. When the degree of correctness of the results of an image-discriminating operation is low, the original is not subjected to reading; it is discharged to be stacked in the paper discharge tray 34b by the selector arm 35. Therefore, the useless reading of the originals is not done in any cases.

When a trouble occurs in the automatic document feeder 20 in the above embodiments, the reading of an original is not done since no signals representative of the detection of an original are obtained from the sensor 36; the reading of the original is done when the trouble has been eliminated.

The above is a description of an image reader in which a primary scanning operation is carried out with the optical scanning system not moved (a read-scanning operation by the image discriminator 50 is also carried out in the same manner) and in which an image sensor having arrayed elements is used; the present invention is not limited to this image reader. For example, a primary scanning operation may be carried out by traversing the upper surface of the original 1 with a laser beam, and the reflected light from the original 1 may be introduced into an image sensor having a single light-receiving surface, via a light-introducing member, such as an optical fiber, or a condenser member. When an image is divided into a plurality of blocks to be discriminated, to subject each thereof to an image discrimination operation, this invention can also be applied to an original having both line images and pictorial images (toned image). Instead of using the image discriminator 50, the serial numbers of the originals which contain pictorial images, which serial numbers are stored in advance in a memory by an input means, such as a keyboard, may be read while or after the original is set, to process the image signals. In this case, applying such information into a memory is troublesome.

As described above, the present invention can provide an image reader capable of reading and processing a large quantity of originals at a high speed, and omitting the sorting of originals to be read and the re-arranging of the read originals in order of pages.

In summary, following four cases 1-4 may be considered in an apparatus wherein an original document is automatically supplied on the original setting table on the picture image reading device and read by the scanning optical system, and after the reading has completed the original document is exhausted;

1. the original document is being fed in the path to the setting table, 2. the original document is set on the setting table, 3. the original document is set on the setting table in case that the optical scanning system returns, and 4. the original document is being exhausted from the setting table.

According to the present invention, following four controls can be carried out when a busy signal, trouble signal or the like is introduced from the external machine to the image reader of the present invention, with respect to the above four cases, respectively;

1. the operation is continued until the original document is set on the setting table, 2. the scanning for reading is stopped and the optical scanning system is returned to the initial position or only the reading is continued in case that the image memory is installed, 3. the operation is continued until the optical scanning system is returned to the initial position, and 4. the exhaust of the original document is continued.

What is claimed is:

1. An image reader comprising:
   a document setting plate for reading an original document fed thereon;
   a document feeder for feeding a document on said document setting plate;
   an optical system for scanning a document on said document setting plate from an initial position to an end position thereof;
   an image converter including a sensor for converting an image of a document scanned by said optical system into electrical signals;
   a processing portion for processing the electrical signals from said image converter into data output signals which are sent to an external device in a receiving state for receiving said data output signals; and
   control means controlling said document feeder, optical system, image converter, and processing portion for terminating the scanning of a document by said optical system and returning said optical system to its initial position upon receipt of a stop signal from said external device indicating an error or non-receiving state after the scanning by said optical system has been started.

2. An image reader according to claim 1, wherein said optical system is arranged to be reciprocatingly moved relative to said document setting plate from its initial position to its end position so as to scan a document fed on said plate.

3. An image reader according to claim 1, further comprising a memory for storing electrical signals representing an image of a document scanned by said optical system, wherein said control means is operated upon receipt of a stop signal from the external device to complete the scanning of the document, store the electrical signals thereof in said memory, return said optical system to its initial position, and send the stored signals as data output signals to the external device only when a resume signal is provided therefrom indicating that the external device has been restored to the receiving state.

4. An image reader according to claim 3, wherein said memory has a capacity for the image signals of at least one document page.

5. An image reader according to claim 1, wherein said processing portion includes means for performing a shade correction operation for correcting the shade level of the data output signals for images of documents scanned by said optical system, and said control means is operated to cause said processing portion to perform said shade correction operation, after a stop signal has been received from the external device, when a subsequent resume signal is provided therefrom indicating that the external device has been restored to the receiving state.

6. An image reader according to claim 5, further comprising a reference shade member of a uniform image density positioned on a portion of said document setting plate, wherein said control means causes said optical system to scan said reference shade member to provide a reference shade level for a shade correction operation.

7. An image reader comprising:
- a document setting plate for reading an original document fed thereon;
- a document feeder for feeding a document along a document feeding path to a set position on said document setting plate;
- an image discriminator for discriminating a threshold density value of a document fed by said document feeder while the document is being fed along said document feeding path and before it has been fed to the set position on said document setting plate;
- an optical system for scanning a document on said document setting plate from an initial position to an end position thereof;
- an image converter including a sensor for converting an image of a document scanned by said optical system into electrical signals; and
- a processing portion for processing the electrical signals from said image converter in accordance with a type of document indicated by the threshold density value discriminated by said image discriminator into data output signals which are sent to an external device in a receiving state for receiving said data output signals.

8. An image reader according to claim 7 further comprising control means controlling said document feeder, optical system, image converter, image discriminator, and processing portion for terminating the scanning of a document by said optical system and returning said optical system to its initial position upon receipt of a stop signal from said external device indicating an error or non-receiving state after the scanning by said optical system has been started.

* * * * *